Patented Feb. 5, 1946

2,394,069

UNITED STATES PATENT OFFICE 2,394,069

DYESTUFF INTERMEDIATES

John David Kendall and Harry Derek Edwards, Ilford, England, assignors to Ilford Limited, Ilford, England, a British company No Drawing. Application December 17, 1943, Serial No. 514,669. In Great Britain January 1, 1943

13 Claims. (Cl. 260—239)

This invention relates to the manufacture of dyestuff intermediates.

In our co-pending application, Serial No. 514,666, filed December 17, 1943, corresponding to British application No. 14/43, there are described the production of compounds of the general Formula I:

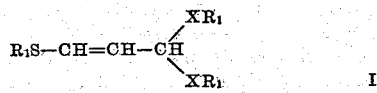

where the groups $R_1$ are alkyl groups and the groups X are both oxygen atoms or both sulphur atoms. Compounds of the type wherein X is S can be prepared as disclosed in aforesaid applications by treating with an alkyl mercaptan, in the presence of an acid condensing agent, a compound of one of the Formulae II, III, IV or V:

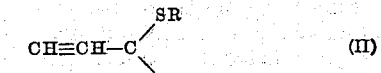

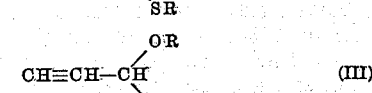

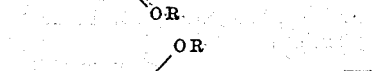

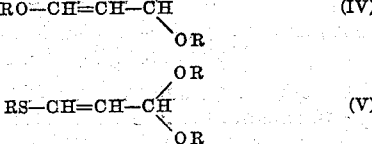

or by treating with an alkyl mercaptan in the presence of a basic condensing agent under pressure, a compound of Formula II.

Compounds of the general Formula II may be obtained by brominating acrolein and treating the product with an alkyl mercaptan followed by heating with an alkali to remove bromine. Compounds of general Formula III may be converted to compounds of general Formula V by treating them with a sodium alkyl mercaptide and an alkyl mercaptan under pressure.

The most convenient compound of general Formula I to prepare is that in which the groups R are ethyl groups since ethyl mercaptan is the most convenient of the alkyl mercaptans to employ. In using the compounds of general Formula I as dyestuff intermediates the condensation to produce dyestuffs may eliminate all the —SR groups so that the nature of the R group is not then of importance.

The acid condensing agent may be any strongly acidic substance; sulphuric acid and zinc chloride have been found very suitable.

According to the present invention, a compound of the general Formula I is converted to a valuable dyestuff intermediate by condensing it in acid conditions with an alkyl, substituted alkyl, aralkyl or substituted aralkyl quaternary salt of a heterocyclic nitrogen base containing a reactive methylene group (including a methyl or mono-substituted-methyl group) in the α or γ position to the heterocyclic quaternary nitrogen atom.

The condensation is preferably effected by heating the reactants together in the presence of a solvent for the reactants and in the presence of a compound capable of reacting with mercaptan or alcohol split off during the reaction. It is found that acetic anhydride is particularly suitable in serving both purposes.

The course of the reaction is believed to be as follows:

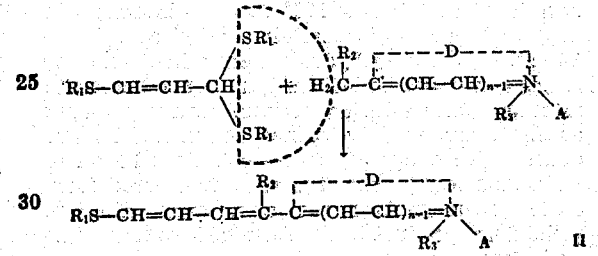

In the foregoing Formula II the group $R_1$ represents an alkyl group, the group $R_2$ is a hydrogen atom or an alkyl or aralkyl group, and the group $R_3$ is an alkyl or aralkyl group. The group $R_3$ may also be a substituted alkyl group, e. g. a hydroxy-alkyl group, or may be an unsaturated aliphatic group, e. g. an allyl group. In general it is preferred that the groups $R_1$, $R_2$ (if not hydrogen) and $R_3$ should be lower alkyl groups, e. g. methyl and ethyl, and for convenience in preparing the initial compounds of Formula I, the group $R_1$ is preferably ethyl. Thus the two most valuable starting materials are β-ethyl-thio acrolein diethyl mercaptal and β-ethyl-thio acrolein diethyl acetal. The group A in the foregoing Formula II represents an acid radicle, e. g. chloride, bromide, iodide, alkyl sulphate, p-toluene sulphonate and perchlorate. Of these, the p-toluene sulphonate salt is preferred as these salts afford the best yields. The compounds produced may be converted to salts of other acids if desired, or may, without isolation, be used for the preparation of dyestuffs as described in copending application Serial No. 514,668, filed December 17, 1944, corresponding to British application No. 16/43. The suffix $n$ stands for an integer less than 3.

D in the foregoing formula is the residue of a heterocyclic nitrogen compound. Examples of suitable heterocyclic nitrogen compounds are substituted and unsubstituted thiazoles, thiazolines, oxazoles, oxazolines, selenazoles, selenazolines, pyridine, quinoline, lepidine, indolenine, diazines (e. g. pyrimidine and the diazines described in British specification No. 425,609), thiodiazoles and quinazoline and the corresponding substituted and unsubstituted polycyclic compounds such as the benzthiazoles, naphthathiazoles and anthrathiazoles, and the corresponding polycyclic oxazoles and selenazoles. Such heterocyclic compounds may contain substituent groups in the benzene nuclei, e. g. alkyl, aryl, amino, hydroxy and alkoxy groups or halogen atoms.

The following examples illustrate the invention:

EXAMPLE I

*Preparation of 1 - ($\omega$ - ethyl - thio - butadienyl) - benzthiazole methiodide*

(a) 1.49 gms. of 1-methyl benzthiazole and 1.86 gms. of methyl-p-toluene sulphonate were fused together at 100° C. for ½ hour, and then gently boiled under a reflux condenser for ten minutes with 2.22 gms. of $\beta$-ethyl-thio acroleindiethyl mercaptal and 12 ccs. of acetic anhydride. The resulting orange solution was poured into a hot aqueous solution of potassium iodide. After cooling and addition of benzene the precipitated oil hardened, and was filtered off. Two crystallisations from ethyl alcohol yielded the product as brown crystals, M. P. 185° C. with decomposition.

(b) 1.49 gms. of 1-methyl benzthiazole and 1.86 gms. of methyl-p-toluene sulphonate were mixed and fused together at 100° C. for 2 hours. 1.90 gms. of $\beta$-ethyl-thio acrolein diethyl acetal and 12 ccs. of acetic anhydride were added and the reaction mixture boiled gently under reflux for 10 minutes. The solution became orange coloured at first, but rapidly turned greenish. It was poured into a hot aqueous-alcoholic solution of potassium iodide, the liquors were filtered from some greenish-black tar and, after dilution, yielded the product in the form of brown crystals as before.

EXAMPLE II

*Preparation of 1:3:3-trimethyl-2-($\omega$-ethyl-thio-butadienyl) -indolenium perchlorate*

3.01 gms. of 2:3:3-trimethyl indolenine methiodide, 6.6 gms. of $\beta$-ethyl-thio acrolein diethyl mercaptal and 25 ccs. of acetic anhydride were gently boiled under reflux for 10 minutes and then poured into warm alcohol and heated for 10 minutes to complete the decomposition of excess acetic anhydride. The liquors were diluted and a hot aqueous solution of 1.6 gm. potassium perchlorate was added. After filtration from a little oil the solution was cooled when the intermediate crystallised as bright green leaflets of M. P. 130° C. (with decomposition) giving a yellow solution in alcohol.

EXAMPLE III

*Preparation of 1 - ($\omega$ - ethyl - thio - butadienyl) - benzselenazole ethiodide*

1.96 gms. of 1-methyl benzselenazole and 2.00 gms. of ethyl-p-toluene sulphonate were fused together at 150° C. for 3 hours. After cooling, 2.22 gms. $\beta$-ethyl-thio acrolein diethyl mercaptal was added, and the whole boiled with 20 ccs. acetic anhydride for 10 minutes under a reflux condenser. At the end of this period the solution was poured, while still hot, into an aqueous-alcoholic solution of potassium iodide. On cooling, the dye intermediate crystallised and was filtered off as brown crystals of M. P. 106° C. with decomposition.

EXAMPLE IV

*Preparation of 1 - ($\omega$ - ethyl - thio - butadienyl) - benzoxazole ethyl-p-toluene sulphonate*

1.33 gms. of 1-methyl benzoxazole and 2.00 gms. of ethyl-p-toluene sulphonate were fused together at 130° C. for 3 hours. The resulting quaternary salt was cooled and 2.5 gms. of $\beta$-ethyl-thio acrolein diethyl mercaptal and 20 ccs. of acetic anhydride were added. The reaction mixture was boiled gently under reflux for 12 minutes. The excess acetic anhydride was distilled off under reduced pressure from a water bath. The residue, consisting principally of 1-($\omega$-ethyl-thio-butadienyl)-benzoxazole ethyl-p-toluene sulphonate, after lixiviation with ether, was dissolved in cold alcohol and the solution made up to 40 ccs. This solution can be used for the preparation of dyestuffs as described in copending application Serial No. 514,668, filed December 17, 1944, corresponding to British specification No. 16/43.

EXAMPLE V

*Preparation of 4 - ($\omega$ - ethyl - thio - butadienyl) - quinoline methyl-perchlorate*

1.43 gms. of lepidine and 1.86 gms. of methyl-p-toluene sulphonate were fused together at 100° C. for 2 hours. To the resultant quaternary salt was added 2.5 gms. of $\beta$-ethyl-thio acrolein acetal and 12.5 ccs. of acetic anhydride, and the whole was boiled gently under reflux for 10 minutes. The reaction mixture was poured into a hot aqueous solution of potassium perchlorate. An oil precipitated which, on trituration with spirit, benzene and ether, yielded the intermediate as brick-red crystals, M. P. 153° C. with decomposition.

EXAMPLE VI

*Preparation of 2-($\omega$-ethyl-thio-butadienyl) quinoline methyl-perchlorate*

2.86 gms. quinaldine and 3.72 gms. of methyl p-toluene sulphonate were fused together at 100° C. for 1 hour. To the resultant quaternary salt was added 2.5 gms. of $\beta$-ethyl-thio acrolein acetal and 25 ccs. of acetic anhydride, and the whole was boiled gently under reflux for 15 minutes. The reaction mixture was poured into hot aqueous alcohol, and the resultant solution was poured into a hot solution of potassium perchlorate. The dye intermediate precipitated and, after cooling, was filtered off. The solid was extracted twice with 100 ccs. of boiling ethyl alcohol and remained as sparingly soluble brown crystals, M. P. 205° C. with decomposition, which gave a bright yellow solution in alcohol.

EXAMPLE VII

*Preparation of 1-($\omega$-ethyl-thio-butadienyl) - 4-chlor-benzthiazole methiodide*

1.84 gms. of 1-methyl-4-chlor-benzthiazole and 1.86 gms. of methyl-p-toluene sulphonate were fused together at 100° C. for 5 hours. The resultant quaternary salt was boiled gently into solution with 20 ccs. of acetic anhydride, 2.5 ccs.

of β-ethyl-thio acrolein acetal were added, and the heating continued under reflux for 12 minutes. The reaction mixture was poured into a hot aqueous-alcoholic solution of potassium iodide. On slight dilution the dye intermediate crystallised. The precipitate of brown crystals was filtered off and washed with ethyl alcohol and ether. After recrystallisation from ethyl alcohol, the product was obtained as shiny dark crystals, M. P. 180° C. with decomposition.

EXAMPLE VIII

*Preparation of 1 - (ω - ethyl - thio - butadienyl) - benzthiazole β-acetoxy-ethyl iodide*

1.6 gm. of 1-methyl benzthiazole β-hydroxy-ethyl iodide and 25 ccs. of acetic anhydride were boiled gently under reflux until the solid passed into solution. 2 ccs. of β-ethyl-thio acrolein acetal was added and the reaction mixture heated for a further 10 minutes. The excess acetic anhydride was then distilled off under reduced pressure and the residue, which was the desired intermediate, was washed with petroleum ether and ethyl ether.

What we claim is:

1. Process for the production of dyestuff intermediates which comprises condensing a compound of the general formula:

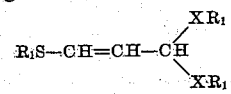

where the groups $R_1$ are alkyl groups and the groups X are the same and are taken from the class consisting of oxygen and sulfur atoms, in acid conditions with a compound selected from the group consisting of alkyl, substituted alkyl, aralkyl and substituted aralkyl quaternary salts of heterocyclic nitrogen bases which contain a reactive methylene group in a position taken from the group consisting of alpha and gamma positions to the quaternary nitrogen atom whereby $R_1XH$ is split off, and recovering a dyestuff intermediate of the formula:

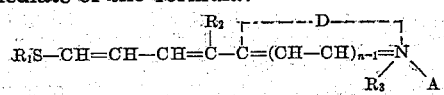

where $R_1$ has the above significance, $R_2$ is a member taken from the group consisting of hydrogen, alkyl and aralkyl, $R_3$ is a member taken from the group consisting of alkyl and aralkyl, A is an acid radical, D represents the atoms necessary to complete a heterocyclic nitrogen nucleus and $n$ is an integer less than 3.

2. Process for the production of dyestuff intermediates which comprises condensing a compound of the general formula:

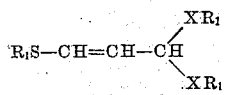

where the groups $R_1$ are alkyl groups and the groups X are the same and are taken from the class consisting of oxygen and sulfur atoms with a compound selected from the group consisting of alkyl, substituted alkyl, aralkyl and substituted aralkyl quaternary salts of heterocyclic nitrogen bases which contain a reactive methylene group in a position taken from the group consisting of alpha and gamma positions to the quaternary nitrogen atom in the presence of a solvent for the reactants and an acid substance capable of reacting with the compound $R_1XH$ split off during the reaction and recovering a dyestuff intermediate of the formula:

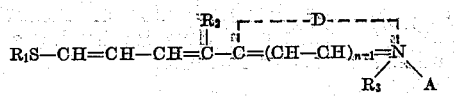

where $R_1$ has the above significance, $R_2$ is a member taken from the group consisting of hydrogen, alkyl and aralkyl, $R_3$ is a member taken from the group consisting of alkyl and aralkyl, A is an acid radical, D represents the atoms necessary to complete a heterocyclic nitrogen nucleus and $n$ is an integer less than 3.

3. Process for the production of dyestuff intermediates which comprises condensing a compound of the general formula:

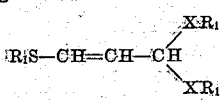

where the groups $R_1$ are lower alkyl groups and the groups X are the same and are taken from the class consisting of oxygen and sulfur atoms, in acid conditions with a compound selected from the group consisting of alkyl, substituted alkyl, aralkyl and substituted aralkyl quaternary salts of heterocyclic nitrogen bases which contain a reactive methylene group in a position taken from the group consisting of alpha and gamma positions to the quaternary nitrogen atom whereby $R_1XH$ is split off, and recovering a dyestuff intermediate of the formula:

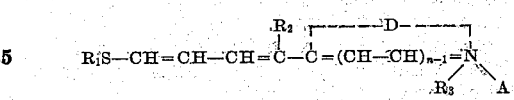

where $R_1$ has the above significance, $R_2$ is a member taken from the group consisting of hydrogen, alkyl and aralkyl, $R_3$ is a member taken from the group consisting of alkyl and aralkyl, A is an acid radical, D represents the atoms necessary to complete a heterocyclic nitrogen nucleus and $n$ is an integer less than 3.

4. Process for the production of dyestuff intermediates which comprises condensing a compound of the general formula:

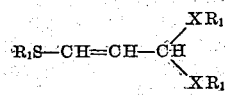

where the groups $R_1$ are lower alkyl groups and the groups X are the same and are taken from the class consisting of oxygen and sulfur atoms with a compound selected from the group consisting of alkyl, substituted alkyl, aralkyl and substituted aralkyl quaternary salts of heterocyclic nitrogen bases which contain a reactive methylene group in a position taken from the group consisting of alpha and gamma positions to the quaternary nitrogen atom in the presence of a solvent for the reactants and an acid substance capable of reacting with the compound $R_1XH$ split off during the reaction and recovering a dyestuff intermediate of the formula:

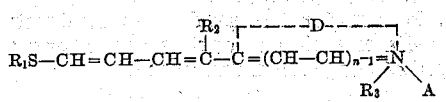

where $R_1$ has the above significance, $R_2$ is a member taken from the group consisting of hydrogen, alkyl and aralkyl, $R_3$ is a member taken from the group consisting of alkyl and aralkyl, A is an acid radical, D represents the atoms necessary to complete a heterocyclic nitrogen nucleus and $n$ is an integer less than 3.

5. Process for the production of dyestuff intermediates which comprises condensing a compound of the general formula:

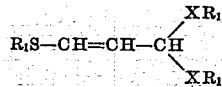

where the groups $R_1$ are alkyl groups and the groups X are the same and are taken from the class consisting of oxygen and sulfur atoms with a compound selected from the group consisting of alkyl, substituted alkyl, aralkyl and substituted aralkyl quaternary salts of heterocyclic nitrogen bases which contain a reactive methylene group in a position taken from the group consisting of alpha and gamma positions to the quaternary nitrogen atom in the presence of an anhydride of a lower fatty acid whereby $R_1XH$ is split off, and recovering a dyestuff intermediate of the formula:

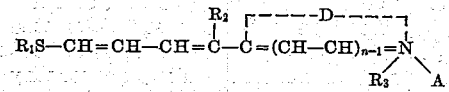

where $R_1$ has the above significance, $R_2$ is a member taken from the group consisting of hydrogen, alkyl and aralkyl, $R_3$ is a member taken from the group consisting of alkyl and aralkyl, A is an acid radical, D represents the atoms necessary to complete a heterocyclic nitrogen nucleus and $n$ is an integer less than 3.

6. Process for the production of dyestuff intermediates which comprises condensing a compound of the general formula:

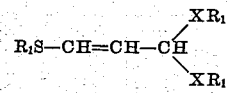

where the groups $R_1$ are lower alkyl groups and the groups X are the same and are taken from the class consisting of oxygen and sulfur atoms with a compound selected from the group consisting of alkyl, substituted alkyl, aralkyl and substituted aralkyl quaternary salts of heterocyclic nitrogen bases which contain a reactive methylene group in a position taken from the group consisting of alpha and gamma positions to the quaternary nitrogen atom in the presence of an anhydride of a lower fatty acid whereby $R_1XH$ is split off, and recovering a dyestuff intermediate of the formula:

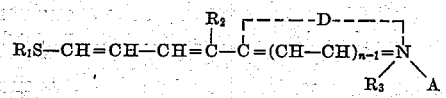

where $R_1$ has the above significance, $R_2$ is a member taken from the group consisting of hydrogen, alkyl and aralkyl, $R_3$ is a member taken from the group consisting of alkyl and aralkyl, A is an acid radical, D represents the atoms necessary to complete a heterocyclic nitrogen nucleus and $n$ is an integer less than 3.

7. Process for the production of dyestuff intermediates which comprises condensing a compound of the general formula:

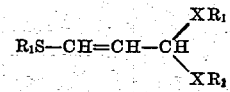

where the groups $R_1$ are alkyl groups and the groups X are the same and are taken from the class consisting of oxygen and sulfur atoms with an alkyl p-toluene sulphonate quaternary salt of a heterocyclic nitrogen base which contains a reactive methylene group in a position taken from the group consisting of alpha and gamma positions to the quaternary nitrogen atom, in the presence of acetic anhydride whereby $R_1XH$ is split off, and recovering a dyestuff intermediate of the formula:

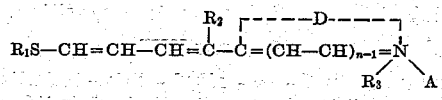

where $R_1$ has the above significance, $R_2$ is a member taken from the group consisting of hydrogen, alkyl and aralkyl, $R_3$ is a member taken from the group consisting of alkyl and aralkyl, A is an acid radical, D represents the atoms necessary to complete a heterocyclic nitrogen nucleus and $n$ is an integer less than 3.

8. Process for the production of dyestuff intermediates which comprises condensing a compound of the general formula:

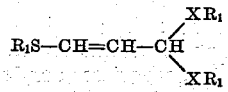

where the groups $R_1$ are lower alkyl groups and the groups X are the same and are taken from the class consisting of oxygen and sulfur atoms with an alkyl p-toluene sulphonate quaternary salt of a heterocyclic nitrogen base which contains a reactive methylene group in a position taken from the group consisting of alpha and gamma positions to the quaternary nitrogen atom, in the presence of acetic anhydride whereby $R_1XH$ is split off, and recovering a dyestuff intermediate of the formula:

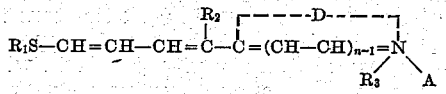

where $R_1$ has the above significance, $R_2$ is a member taken from the group consisting of hydrogen, alkyl and aralkyl, $R_3$ is a member taken from the group consisting of alkyl and aralkyl, A is an acid radical, D represents the atoms necessary to complete a heterocyclic nitrogen nucleus and $n$ is an integer less than 3.

9. Dyestuff intermediates of the general formula:

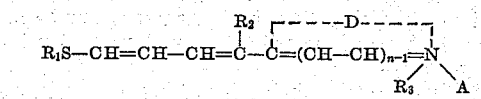

wherein $R_1$ is an alkyl group, $R_2$ is selected from the class consisting of the hydrogen atom and alkyl and aralkyl groups, $R_3$ is selected from the class consisting of alkyl and aralkyl groups and substituted groups of this type, A is an acid radical, D is the residue of a heterocyclic nitrogen nucleus and $n$ is an integer less than 3.

10. Dyestuff intermediates of the general formula:

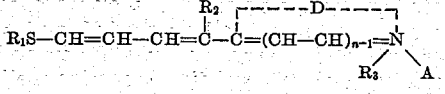

wherein $R_1$ is a lower alkyl group, $R_2$ is a group of the structure $-(CH_2)_{x-1}H$ where $x$ is an integer less than 4, $R_3$ is a lower alkyl group, A is an acid radical, D is the residue of a heterocyclic nitrogen nucleus and $n$ is an integer less than 3.

11. A dyestuff intermediate of the formula
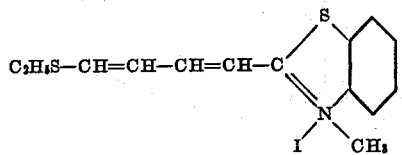
which in the form of brown crystals melts at 185° C.
12. A dyestuff intermediate of the formula
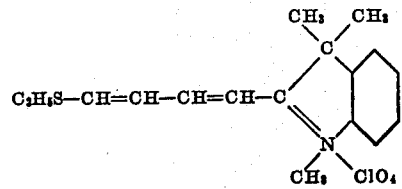
which in the form of bright green crystals melts at 130° C. with decomposition.
13. A dyestuff intermediate of the formula
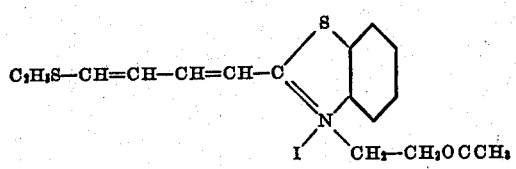
JOHN DAVID KENDALL.
HARRY DEREK EDWARDS.